United States Patent

Denison et al.

[11] Patent Number: 6,078,683
[45] Date of Patent: Jun. 20, 2000

[54] METHOD AND SYSTEM FOR RECOGNITION OF CURRENCY BY DENOMINATION

[75] Inventors: Jack Denison; Robert J. Burgert, both of Bensalem, Pa.; Michael DeFeo, Somerdale, N.J.; John Mikkelsen, Philadelphia; Peter Truong, Willow Grove, both of Pa.

[73] Assignee: De La Rue, Inc., Chantilly, Va.

[21] Appl. No.: 08/975,475

[22] Filed: Nov. 20, 1997

[51] Int. Cl.[7] .............................. G06K 9/00; G06K 9/62; G06K 9/56; B07C 5/00
[52] U.S. Cl. ...................... 382/135; 382/156; 382/205; 382/289; 209/534
[58] Field of Search .................................. 382/135, 156, 382/157, 158, 205, 289; 209/534; 364/148.03; 701/59

[56] References Cited

U.S. PATENT DOCUMENTS

| | | | |
|---|---|---|---|
| 3,564,268 | 2/1971 | Bayne et al. | 250/566 |
| 3,679,314 | 7/1972 | Mustert | 356/71 |
| 3,976,198 | 8/1976 | Carnes, Jr. et al. | 209/534 |
| 4,041,456 | 8/1977 | Ott et al. | 382/135 |
| 4,255,057 | 3/1981 | Williams | 356/435 |
| 4,464,787 | 8/1984 | Fish et al. | 382/135 |
| 4,487,306 | 12/1984 | Nao et al. | 194/207 |
| 4,944,505 | 7/1990 | Sherman, III | 271/265.03 |
| 5,012,932 | 5/1991 | Omura et al. | 209/534 |
| 5,309,515 | 5/1994 | Troung et al. | 382/135 |
| 5,313,287 | 5/1994 | Barton | 358/458 |
| 5,317,673 | 5/1994 | Cohen et al. | 704/232 |
| 5,399,874 | 3/1995 | Gonsalves et al. | 250/556 |
| 5,430,812 | 7/1995 | Barnsley et al. | 382/235 |
| 5,437,357 | 8/1995 | Ota et al. | 194/206 |
| 5,467,405 | 11/1995 | Raterman et al. | 382/135 |
| 5,467,406 | 11/1995 | Graves et al. | 382/135 |
| 5,468,971 | 11/1995 | Ebstein et al. | 250/556 |
| 5,542,518 | 8/1996 | Kurosawa et al. | 194/206 |
| 5,619,620 | 4/1997 | Eccles | 382/158 |
| 5,652,802 | 7/1997 | Graves et al. | 382/135 |
| 5,680,472 | 10/1997 | Conant | 382/135 |
| 5,757,001 | 5/1998 | Burns | 250/339.11 |
| 5,818,976 | 10/1998 | Pasco et al. | 382/289 |
| 5,822,448 | 10/1998 | Graves et al. | 382/135 |

FOREIGN PATENT DOCUMENTS

| | | |
|---|---|---|
| 0342647 A2 | 5/1989 | European Pat. Off. . |
| 0367921 A2 | 8/1989 | European Pat. Off. . |
| 0480736 A2 | 10/1991 | European Pat. Off. . |
| WO 91/06074 | 5/1991 | WIPO . |

OTHER PUBLICATIONS

Probabilistic Neural Networks for Medical Image Quantification, Adali et al; IEEE International Conference on Image Processing, ISBN: 0–8186–6952–7, vol. 3, pp. 889–892, Nov. 1994.

*Primary Examiner*—Amelia Au
*Assistant Examiner*—Mehrdad Dastouri
*Attorney, Agent, or Firm*—Oliff & Berridge, PLC

[57] ABSTRACT

A denomination recognition apparatus and method uses a programmed microelectronic CPU (14) to execute program instructions (19) stored in PROM (18) to read in pixel data from an optical imaging section including LEDs (15) and photodiodes (16) for generating signals which can be converted to a first image of a currency note (13) being transported along the path of travel. The CPU (14) receives position and skew data detected by external sensors for sensing the position and skew of the note (13). The CPU (14) executes the program instructions, first to assemble a first data image of pixel data representing a two-dimensional image of substantially all of the note while averaging the pixel data in groups for further processing; second, to correct the first data image based on the skew data to eliminate skew; and third, to relate the first data image to a plurality of pre-defined data images according to a mathematical function to determine whether the first data image can be classified as matching any one of the pre-defined data images corresponding to a specific currency denomination.

12 Claims, 9 Drawing Sheets

METHOD AND SYSTEM FOR RECOGNITION OF CURRENCY BY DENOMINATION

TECHNICAL FIELD

The invention relates to currency counting methods and machines, in which a total value of the currency is determined by counting notes of various denominations that may be worn, soiled or skewed as they pass through a currency counting machine.

DESCRIPTION OF THE BACKGROUND ART

Many existing currency counting machines determine only the piece count of the currency (i.e., "x" number of bills), leaving it up to the operator to infer the monetary value of the currency being counted. An automated method of determining the denomination of paper currency is a valuable addition to these currency counting machines. With such an automated method, the ease, speed, and accuracy of financial transactions can be increased, thereby increasing the likelihood of detecting both human error and fraud.

United States currency presents unique challenges for denomination recognition by automated methods. Unlike most other currencies, every denomination of currency is printed using the same colors and types of inks, and the physical size of every denomination is likewise identical. As a result, neither the length, width, nor color of a piece of United States currency offers any information regarding that piece's value.

Further challenges arise when attempting to integrate a denomination recognition method into high speed currency counting machines. Typically, the side-to-side position (lateral displacement), orientation (face up or down, top edge leading or trailing), angular skew, and velocity of transport of the notes are poorly controlled.

A light transmissive technique for denomination recognition is disclosed in Kurosawa et al., U.S. Pat. No. 5,542,518. In Kurosawa et al., the image data is processed using a technique involving hyperplanes to separate image data vectors for respective pairs of denominations into two regions. The scanned image data vector is then compared to see which of the two vector regions it is in relative to the hyperplane, and the denomination corresponding to image data in the opposite vector region is discarded. By making several sets of comparisons with image data separated by hyperplanes, the scanned image data is finally identified as being most like one other set of image data for a specific denomination.

The above system limits scanning to specific areas of the note, and thus the above-described recognition system is inherently sensitive to how the note is fed (i.e., the note's lateral position and skew) and note damage.

The above-described recognition system also utilizes hyperplanes (a subset of all correlation techniques) in combination with a binary search technique to determine the category matching the target note. This technique varies from traditional neural networks in which hyperplanes are used in conjunction with other elements to resolve the system in one pass with a higher degree of confidence.

In response to these challenges, an automated method has been invented which accomplishes the goal of denomination recognition of United States currency in currency counting machines, and this method can be easily extended to any other type of paper currency. As will be shown, this denomination recognition method is accomplished in a manner which is insensitive to the lateral displacement, orientation, angular skew, and velocity of transport of the notes in a currency counting machine. Further, the method described is insensitive to a common method of fraud used with United States currency, in which the corners of high denomination notes are attached to a lower denomination note forming a so-called "raised" note.

SUMMARY OF THE INVENTION

The present invention is characterized by taking a complete transmissive image of the note and applying the necessary image processing techniques to digitally image the note, correct for skew, and neutralize the effects of note damage.

The invention is practiced as a method of detecting the denomination of a currency note transported along a path of travel, including the steps of receiving skew and position data detected by external sensors for sensing the position of the note; assembling a first data image of pixel data representing a two-dimensional image of substantially all of the note while averaging said pixel data into groups of pixel data for further processing; adjusting the first data image to remove the skew; and relating the first data image to a plurality of pre-defined data images according to a mathematical function to determine whether the data image can be classified as matching any one of the pre-defined plurality of data images for a specific currency denomination.

The invention uses a system of "big" pixels to average the data and to reduce image processing time. Data for the individual pixels, which has been converted from individual analog signals, are grouped in arrays of 3×3 individual pixels to become "big" pixels. An array of 30×11 big pixels substantially covers the area of a note.

In order to achieve the lowest possible unknown and miss-identify rates, a further step was developed to minimize the effects of normal note damage. In this step, each of the pixels in the interior area of the note image is checked for an unattenuated signal which denotes the absence of intervening material, i.e., open space. If an open space is detected, (i.e., signifying a hole or tear) that component of the image ignored by setting it to a neutral value. This method creates stable image data with decreased sensitivity to anomalies in the note such as holes, tears, and oil stains thereby significantly improving recognition rates when running teller quality currency.

The recognition technique utilized by the invention employs a calculated accuracy estimate (relative entropy) for each category in combination with a empirically determined threshold to set minimum requirements for a "good" match. This technique allows tuning of the recognition system based on end user requirements and external conditions such as note quality.

To achieve the required note per minute processing requirements for the banking industry, the invention uses a method for handling negative skews that was developed to allow processing to occur while the note was passing over the image sensor. This technique utilizes mirror symmetry to change the reference point for the pattern based on the direction of note skew. A note with negative skew is scanned as if it were flipped over, allowing the image of the negatively skewed note to be scanned in real time. Without this technique processing would be delayed until the note completely passed the image sensor, thus delaying response of the system and decreasing throughput.

The invention further provides a technique for calibrating the image sensors. The technique adjusts the overall LED power, the gains on each photodiode, and performs a secondary two point calibration to calculate the factors required to perform the necessary transform. The end result of this process are pixels scaled between 0 (opaque) and 1 (100% light transmissive) without operator intervention and without the use of light and dark currency samples for calibration.

The invention provides a method and machine with increased tolerance to notes fed at an angle, or skewed, with respect to the feed mechanism of the currency counter.

The invention provides a method and machine with increased tolerance to lateral displacement of the notes, that is, notes fed off-center with respect to the feed mechanism of the currency counter.

The invention provides a method and machine with increased tolerance to currency in poor condition, that is, currency that is work, torn, faded, or marked.

The invention provides a method and machine which reduces processing time by using big pixels, which are each a 3×3 array of small pixels. If only small pixels were used, data images contain nine times more data, and computations involving the patterns (i.e., the dot products) would take nine times as long.

Other objects and advantages of the invention, besides those discussed above, will be apparent to those of ordinary skill in the art from the description of the preferred embodiment which follows.

In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

DESCRIPTION OF THE PREFERRED EMBODIMENTS

Figure 1:
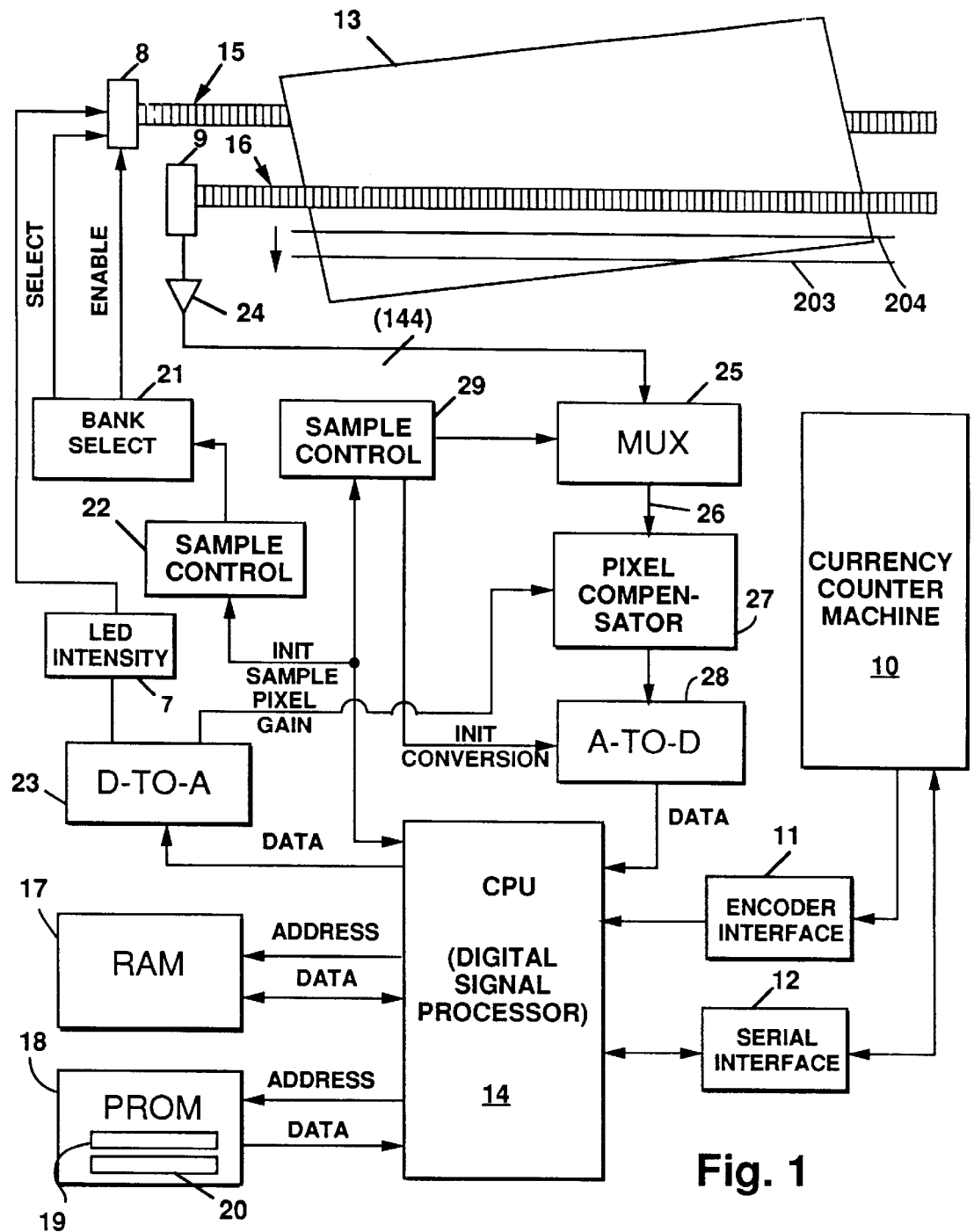
FIG. 1 is a block diagram of a currency denomination recognition apparatus of the present invention.

Referring to FIG. 1, the present invention is embodied in a currency recognition apparatus which is interfaced to an external currency counter machine 10. The preferred currency counter machine 10 in this example is the Brandt Model 2800. This machine 10 counts the number of bills or notes, while the apparatus of the present invention detects the denomination of each note 13 and signals it to the currency counter machine 10 for tabulating the final currency value.

Figure 1A:
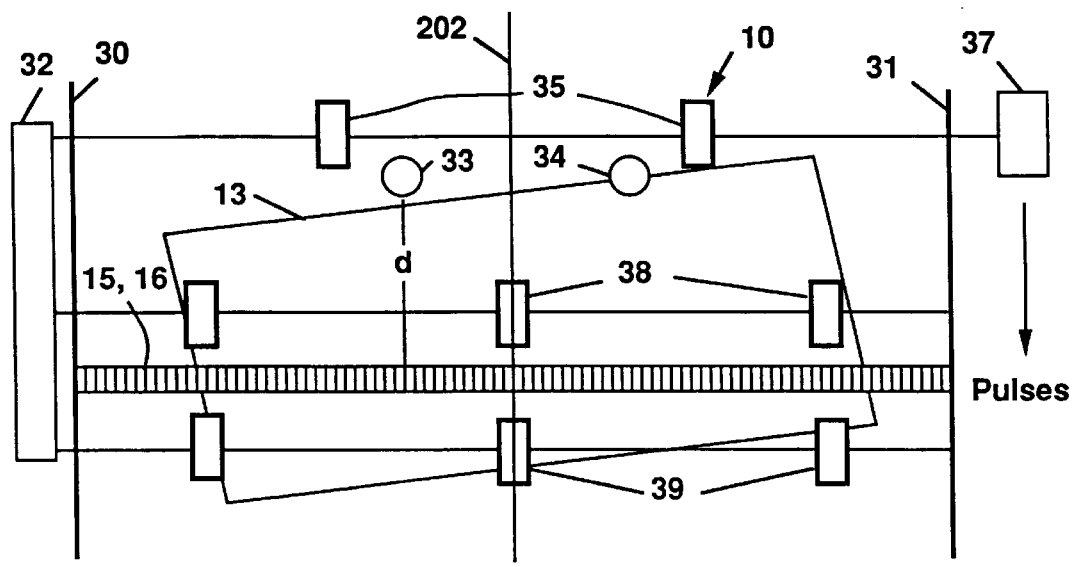
FIG. 1a is a detail diagram showing certain count sensors, the image sensor and an encoder clock on the currency counter machine seen in FIG. 1.

The recognition apparatus further includes an imaging sensor section 15, 16 for generating and sensing light signals. As seen in FIG. 1a, the currency counter machine 10 includes a transport mechanism supported between walls, 30, 31 and including drive belt 32 which drives main drive wheels 35, and sets of feed rollers 38, 39, which feed note 13 through the machine 10. Count sensors 33, 34 are located upstream from the imaging sensor section 15, 16. Signals from the count sensor 33, 34 are transmitted through a serial data interface 12 seen in FIG. 1. The serial data interface 12 operates according to the well known RS-232 standard. An encoder clock 37 (FIG. 1a) is coupled to the transport mechanism on the currency counter machine 10 and generates a clock pulse train as a function to time correlated to the known speed of the transport mechanism. This signal is used to track the position of the note, and this signal is received through an encoder interface 11 seen in FIG. 1. The transport mechanism moves currency notes, such as note 13, in a direction of travel that is generally parallel to the width of a note 13 (as opposed to its length), except that the note 13 may be somewhat skewed from a completely horizontal or transverse position. In order to perform the task of locating, de-skewing, and classifying the notes, the recognition apparatus utilizes note location data from the encoder 35 and skew data from the sensors 33, 34 to determine the location of the note.

The imaging section 15, 16 includes a first circuit board 8 with a 92×1 array of LED (light emitting diode) light sources 15 (FIG. 1) extending collectively a length of nine inches. The LED array 15 is mounted opposite a circuit board 9 carrying an array of 144×1 photodiode detectors 16 (FIG. 1) extending for a comparable length of nine inches. The LEDs are preferably HLMP-6665 and HLMP-6656 LEDs available from Hewlett-Packard, and the photodiodes are preferably the Photodiode Array #180381-8 (available from UDT). The photodiodes 16 are scanned by a microelectronic CPU 14 (FIG. 1) to produce a transmissive image of the bank note 13 being processed. The image is analyzed by the microelectronic CPU 14 to determine the denomination by comparing the scanned image to a plurality of pre-defined images 20 stored in a memory 18. The microelectronic CPU 14 is preferably the TMS320C32 digital signal processor available from Texas Instruments.

The microelectronic CPU 14 is operated according to a program 19, which is stored in non-volatile programmable read only memory 18 (PROM) along with a set of pre-defined images 20 for recognition of a set of currency denominations such as $1, $2, $5, $10, $20, $50, $100. The PROM 18 is preferably of at least 256K bytes data storage capacity. The microelectronic CPU 14 is also connected to the PROM 18 by typical address bus, data bus and control line connections, as well as by buffers (not shown) and a wait state generator (not shown) to account for the different speed of the CPU 14 and the typical integrated circuits used in the apparatus. The CPU 14 is also connected via the above-described connections to a random access memory (RAM) 17 of at least 384K bytes of capacity. The RAM is preferably formed of static RAM circuits, but in other embodiments dynamic RAM circuits could be used if sufficient refresh circuitry and power were available.

Still referring to FIG. 1, the microelectronic CPU 14 is interfaced to the LEDs 15 through a SAMPLE CONTROL circuit 22 and a group of BANK SELECT circuits 21 for sending SELECT signals and ENABLE signals to the LEDs 15. The ninety-two LEDs 15 are divided into nine banks, each having ten LEDs, except the last bank which has twelve. The microelectronic CPU 14 transmits an "initiate sample" (INIT SAMPLE) signal to the LED SAMPLE CONTROL circuit 22 to generate a sequence of timing signals so that the banks of LEDs are turned on sequentially to conserve power. The CPU 14 also transmits data through a D-to-A converter 23, to control a power signal to the LEDs from a LED INTENSITY circuit 7. In this embodiment, the preferred commercial circuit for the D-to-A converter is an AD 7528 eight-bit D-to-A converter available from Analog Devices. The LED INTENSITY control circuit 7 controls the power or intensity of the LEDs 15 according to certain scaling factors to be described for controlling the image data received from scanning a note.

On the light detecting side of the imaging sensor section, the photodetecting diodes 16 are arranged in a 144×1 array. Each diode is connected through a transimpedance amplifier circuit 24 (one per diode), and these circuits 24 perform a current to voltage transformation. Data is received from the photodiodes 16 one at a time in scanning through the 144×1 array. The one hundred and forty-four amplifier circuits 24 connect to nine sixteen-to-one multiplexer (MUX) circuits 25, for sequentially enabling the operation of the diodes 16 and their associated amplifier circuits 24. The multiplexer circuits 25 are controlled through a pixel SAMPLE CONTROL circuit 29, which responds to the initiate sample signal from the CPU 14 to control the sequential operation of the photodiodes 16 in relation to the turning on and off of the banks of LEDs 15. As the diode scan reaches "diode 9" in the first sixteen diodes 16, the second bank of LEDs 15 is turned on, in anticipation of the scan reaching the second group of sixteen diodes 16. As the diode scan reaches "diode 25" in the second sixteen diodes 16, the first bank of LEDs 15 is turned off, and the third bank of LEDs 15 is turned on along with the second bank of LEDs 15 that was previously turned on. In this way the scan sequences through the diodes 16, while turning on pairs of banks of LEDs 15 in a manner so as to provide a consistent light source opposite the moving position of the active diodes 16, while conserving power.

The multiplexers 25 collectively connect to a single analog output channel 26 through which the diode signals are transmitted serially. Each signal represents a "small pixel" in an image map that is stored in the RAM 17 for the note 13 being scanned. The single analog output channel 26 is connected to a PIXEL COMPENSATOR circuit 27. Included in this circuit 27 are amplification, filtering and gain control functions and a gain control input from the D-to-A converter 23 for scaling the pixel signals received from the photodetectors. The pixel signals are analog signals which are converted through an analog-to-digital (A-to-D) converter to provide digitized pixel data to the microelectronic CPU 14. The A-to-D converter 28 is preferably a TM55101 integrated circuit available from Texas Instruments. A pixel SAMPLE CONTROL circuit 29 is connected to receive the initiate sample timing signal from the CPU 14. The pixel SAMPLE CONTROL circuit 29 generates control signals to the CPU 14 to cause gain values to be output via DMA circuitry in the CPU 14 to the PIXEL COMPENSATOR circuit 27. The pixel SAMPLE CONTROL circuit 29 also generates a sequence of signals to the multiplexers 25 such that the pixel signals are received one at a time, converted from analog to digital signals by A-to-D converter 28 and stored in memory. Each set of 144 small pixels forms one row of image data. As the note moves past the array of LEDs 15 and the array of photodiodes 16, successive rows of pixels are imaged for regions 203, 204 as shown in FIG. 1 to provide a two-dimensional array of data in memory which captures substantially the complete image of the note 13 with a few exceptions to be discussed below.

Figure 3:
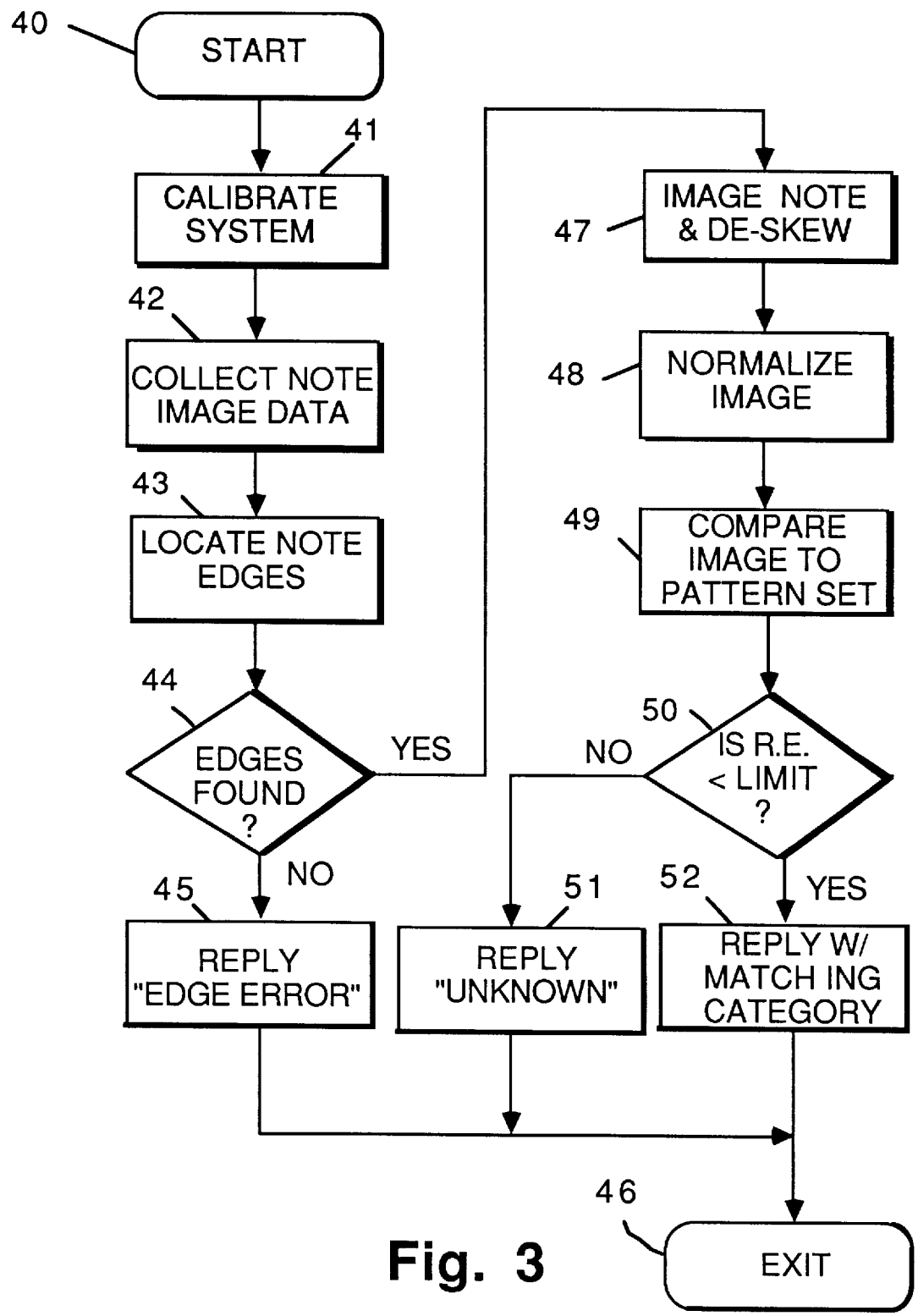
FIG. 3 is a flow chart of the overall operation of the apparatus of FIG. 1 according to a stored program.
Figure 4:
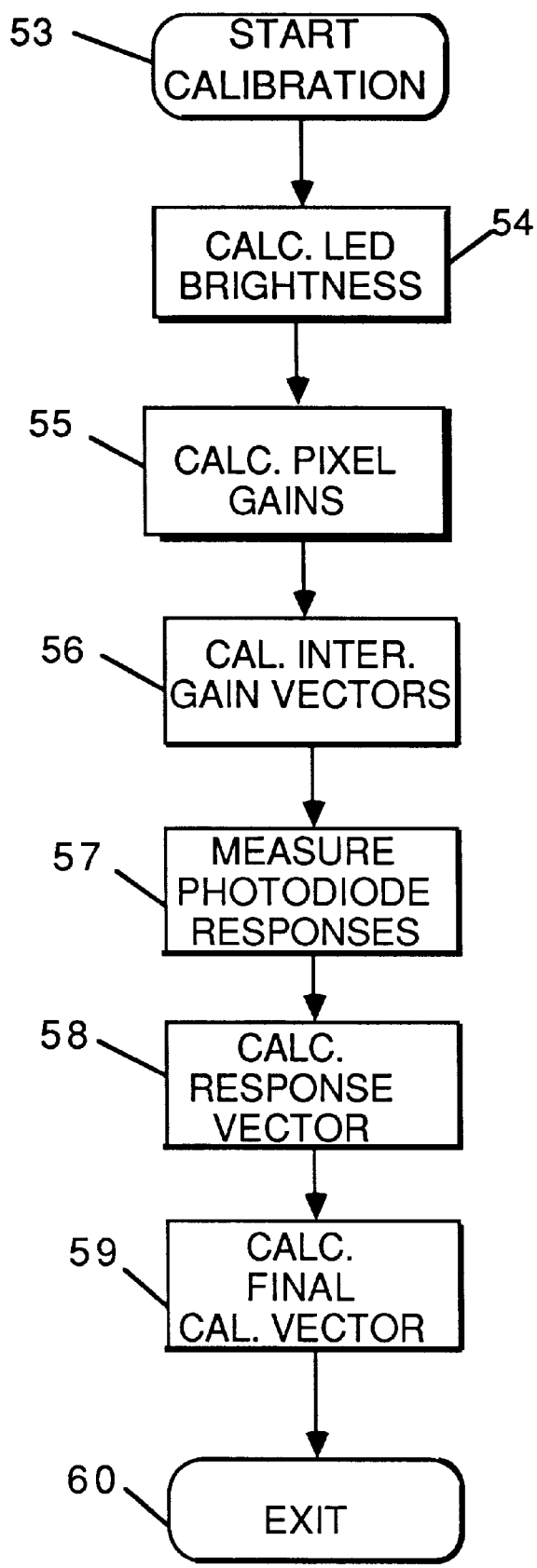
FIGS. 4, 5a, 5b, 6, 7, 8, 9 and 10 are detailed flow charts of the stored program of FIG. 3.

The operation of the apparatus 10 is illustrated in FIG. 3 representing overall operation of the program for the CPU 14. After startup of the denomination recognition portion of the program 19 represented by start block 40, the CPU 14 executes a calibration routine 41 (FIG. 4). After calibrating the imaging section, the CPU 14 executes a block of instructions 42 to scan and read in the raw pixel data and store it in the RAM 17. As part of this process, the CPU 14 executes a film loop manager routine seen in FIG. 6 to scale and process the raw pixel data and store it as an image for further processing. Next, the CPU 14 executes a routine represented by process block 43 to locate the edges of the note 13 and determine the skew of the note 13.

Next, as represented by decision block 44, a test is made to determine if the edge location activities in block 43 were successful. If so, as represented by the "YES" result, processing proceeds to block 45. If unsuccessful in block 44, as represented by the "NO" result, an "edge error" is signaled to the currency counter 10, as represented by process block 45, and the denomination recognition routine is exited as represented by end block 46. Returning to block 44, after the edges are located and the skew angle is determined, the note is imaged in block 47 using "big" pixels, which is a form of blurring or averaging the image data and desensitizing it to irregularities in the note due to such things as marks, water stains, soiling and damage.

As the image data is assembled in big pixels, it is also de-skewed by applying the skew angle to the scanned image data. Next, the image data is normalized, as represented by process block 48, which means that where holes and tears are detected, the data is set to a neutral value. Then, as represented by process block 49, the scanned image data is related to the predefined image data using a neural network processing algorithm. As represented by decision block 50, the result from the computation in block 49 is tested by comparing the relative entropy of the selected predefined pattern to a specified range or tolerance to see if a "good match," which means an acceptable match, has been detected. If not, a message "UNKNOWN" is output to the currency counter machine 10, as represented by process block 51 and the routine is exited as represented by terminal block 46, Assuming a good match is detected, as represented by the "YES" result from decision block 50, the denomination of the matching category is reported to the currency counter 10 through interface 11, as represented by process block 52, and the denomination recognition portion of the program is exited as represented by end block 46.

Besides the currency recognition portion (FIG. 3) of the program 19, there are other portions for communicating with the currency counter. When the recognition process recognizes a note or when an error occurs, a response is passed to a command processor portion of the program 19 which formats the data and pushes it to the output stream for transmission to the currency counter. Responses can include the denomination of the target note, its orientation, and any error codes generated by the system. As noted above, the recognition system passes commands and data to the controlling system via the serial data interface 12. The physical link is a three wire interface (TX, RX and GND) connected to serial data interface 12, which includes a universal asynchronous transmitter and receiver (UART). The command processor portion of the program 19 controls input and output streams which pass data between the recognition system and the currency counter machine 10.

When an input is received from the currency counter 10, a interrupt service routine picks the character up from the UART and stores it in a variable length packet. Once complete the packet is passed to the command processor of the program 19, which then performs the necessary actions based on the command and responds to the currency counter machine 10 accordingly.

The output function is handled in a similar manner. When data is to be transmitted to the currency counter machine 10, the command processor stores the characters to be sent in a variable length packet. The packet is then passed to an interrupt service routine which feeds the characters to the UART in the serial data interface 12 as each proceeding character is output to the currency counter machine 10.

Referring to FIG. 4, the calibration of the imaging sensor section that was described generally with respect to process block 41 is illustrated in more detail. After beginning the calibration routine, which is represented by start block 53, LED brightness is adjusted by executing instructions represented by process block 54. The gains on the photodiode amplifiers 24 (FIG. 1) are all set to a predetermined, small value. A successive approximation calibration scheme is then used to adjust the LED power until the average response from each pixel is at half scale (128 of 255). This adjusts the LED power to help neutralize component variations and extends the useful life of the LEDs 15 by reducing the power output to an absolute minimum.

To calibrate the photodiode amplifiers 24 (pixel gains), as represented by process block 55 (FIG. 4), the LEDs 15 are set to the power level determined previously. A successive approximation routine is then executed to adjust the gain of the PIXEL COMPENSATOR circuit 27 so that each pixel returns the largest value which is less than a maximum analog value which can be input to the A-to-D converter 28 (5 volts or 255). This process locates the largest gain for each photodiode 16 which does not saturate the sensing and interface circuitry, ensuring that each photodiode 16 is operating in a usable range when not blocked by paper. The one hundred forty-four gain values, referred to as the vector XC, are multiplied by a constant boost factor (2.5) and applied to each photodiode 16 when scanning images. The purpose of the boost factor is to allow the intensity values measured through the note to fill more of the A/D range.

In order to achieve the requirement of scaling the output of each pixel for comparison, a third step of the calibration procedures takes light and dark measurements for each photodiode using the LED power and PIXEL COMPENSATOR circuit gains calculated in the first and second steps described above. The light and dark data is then used to solve a system of equations which yield light and dark scaling factors. These scaling factors, when applied to the analog photodiode reading convert the measurement to an absolute scale ranging from "0" (opaque) to "1" (maximum light transmissivity) which can then be utilized in the recognition system.

The calculation of certain of these scaling factors, referred to as intermediate gain vectors are represented by process blocks 56 are described as follows:

YC=Measured Response for Each Pixel Using XC Gain with the LEDs On, and

XC2=XC Gains Divided By 2.

The calculation of still other of these scaling factors, referred to as measured photodiode response vectors are represented by process block 57 and are described as follows:

YC2=Measured Response for Each Pixel Using XC2 Gain with the LEDs On,

XB=Empirically Determined Boosted Gain (2.5×XC), and

YD=Measure Response for Each Pixel Using XB Gain with the LEDs Off.

Using these vectors, the following response vector YB is then calculated as represented by process block 58:

dy/dx=(YC−YC2)/(XC−XC2) (which is the slope of the pixel response vs. gain function), and YB=YC+dy/dx*(XB−XC), which is the theoretical response for each pixel using the boosted gains (XB) with the LEDs on.

The primary results are the YD and YB vectors which are then used to implement the final compensation stage. In this stage a linear mapping is used to map YD into "0" and YB into "1" to produce a transform in which the transformed pixel values can be compared to each other and to absolute standards corresponding from 0% to 100% light transmissivity.

The mapping uses the equations shown below:

$$F(X)=C0+(C1*X)$$

where F(X) is the calibration function and X, C0, and C1 are equal to the following:

X=Vector containing raw analog pixel data.

C0=Dark scaling vector.

C1=Light scaling vector.

C0 and C1 are derived by solving the following set of expressions:

$$F(X)=C0+(C1*X)$$

$$F(YD)=0.0$$

$$F(YB)=1.0$$

$$C0=-YD/(YB-YD)$$

$$C1=1.0/(YB-YD)$$

Once these calculations are complete, as represented by process block 59, the LED power level, amplifier gains, and light and dark scaling factors are applied to the circuitry 7, 27 controlling the LEDs 15 and the photodiodes 16.

An advantage of this procedure is that it requires no operator intervention and does not require the use of reference currency samples (light and dark notes). In normal operation calibration occurs when the mechanism stops with the sensor clear (no errors) and whenever a system reset occurs. When the calibration routine is complete, the CPU 14 returns to executing other portions of program 19 as represented by the exit block 60.

Figure 5A:
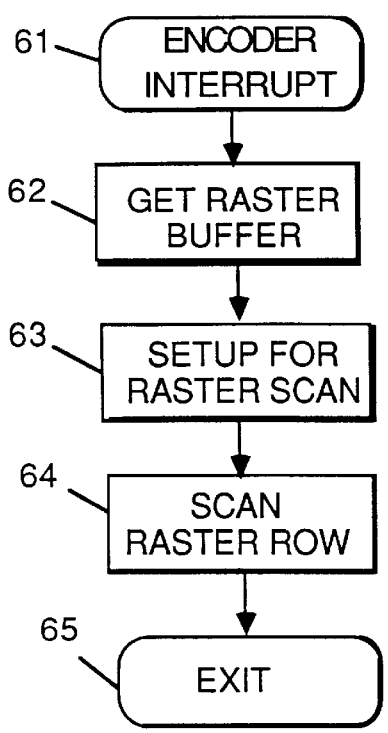
Figure 5B:
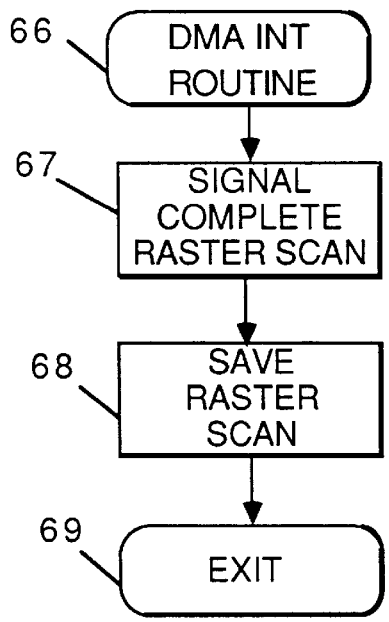

Referring to FIGS. 5a and 5b, the collection of the note image data, which was described generally with respect to process block 34, will now be described in more detail. The imaging process is responsible for scanning each photodiode 16 in order to build the note images required by the recognition process (FIG. 3). When the currency counter's transport mechanism is engaged, the currency counter begins triggering raster scans every 1.6 mm of mechanism travel at a pixel scan rate of 750 kHz. This effectively sizes each small pixel of data as corresponding to a region 1.6 mm in length. The region of each pixels is further sized to about 1.6 mm in width due to the coverage of each of the one hundred forty-four diodes within a linear dimension of nine inches.

The raster scan trigger is provided from the encoder 37 (FIG. 1a) connected to the transport mechanism of the currency counter 10. This device generates a signal for each 1.6 mm of note travel which starts the interrupt service routine illustrated in FIG. 5a commencing with start block 61. During execution of the first process block of this routine 62, the CPU 14 points to an empty raster buffer for storing the data. Then, as represented by process block 63, the CPU 14 sets up to generate a DMA interrupt signal to the CPU 14 (which incorporates DMA circuitry) to rapidly transfer data for a raster scan row. It then begins the scan of the individual photodiodes 16, as represented by process block 64, until a DMA interrupt occurs, which terminates the encoder interrupt as represented by terminal block 65.

During the raster scan operations represented in FIG. 5a, the banks of LEDs 15 (FIG. 1) are turned on and off, as described above, at the power level determined in the calibration stage, while the A-to-D converter 28 (FIG. 1) samples each of the one hundred and forty-four photodiode elements 16 one at a time. Prior to triggering an A-to-D conversion, the previously calculated amplifier calibration factor for the current photodiode 16 is applied to the gain stage of the PIXEL COMPENSATOR circuit 27 (in which there is but one analog channel) prior to coupling the data to the A-to-D converter 28. The A-to-D conversion is then triggered and the system is prepared for reading a signal from the next photodiode 16.

This operation, which is handled in hardware using a direct memory access channel (DMA) to minimize sample to sample latency, scales each analog reading to ensure that the data point is in the usable range of the A/D converter and can be processed by the system. The resulting compensated raster data is then stamped with an encoder value indicating its position and stored in RAM 17 for further processing.

Referring to FIG. 5b, when a DMA interrupt occurs, as represented by start block 66, the CPU 14 sets a flag to denote that a raster scan has been completed, as represented by process block 67, and then saves the raster scan data for one row in a circular buffer called a "film loop" for holding the fully scanned image of a note, as represented by process block 68. The DMA interrupt routine is then completed, as represented by exit block 69, and the CPU 14 returns from the interrupt.

Figure 6:
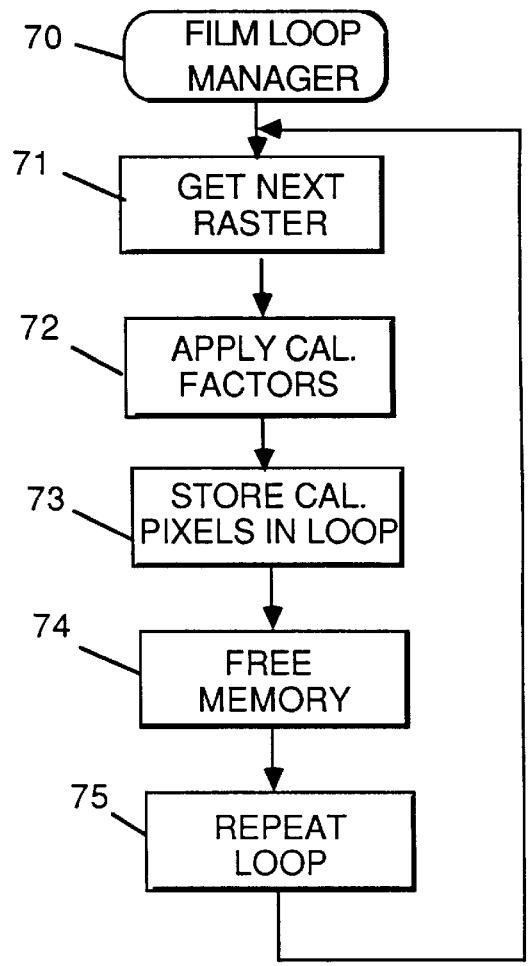

Once raster scans become available from the process in FIGS. 5a and 5b, a film manager routine seen in FIG. 6 begins to process and maintain the film loop, as represented by start block 70. As represented by process block 71, the next raster row to be processed is loaded into a working register in memory and, as represented by process block 72, dark and light scaling factors are applied to the raw pixel data according to the equation:

$$F(X)=C0+(C1*X)$$

where C0 and C1 are the dark and light scaling factors and X is the value of the pixel being calibrated. As described in the calibration process, this normalizes the pixels so that they can be compared to absolute values and to each other. These fully compensated rasters are then stored back into the circular buffer, as represented by process block 73, where the raster data is maintained while being used by the recognition process and then discarded when no longer needed. At such time as the data is discarded, an original raster location is returned to the free memory pool, as represented by process block 74. The process continues by looping back through block 75 to block 71 through block 69 until interrupted by other routines.

Figure 7:
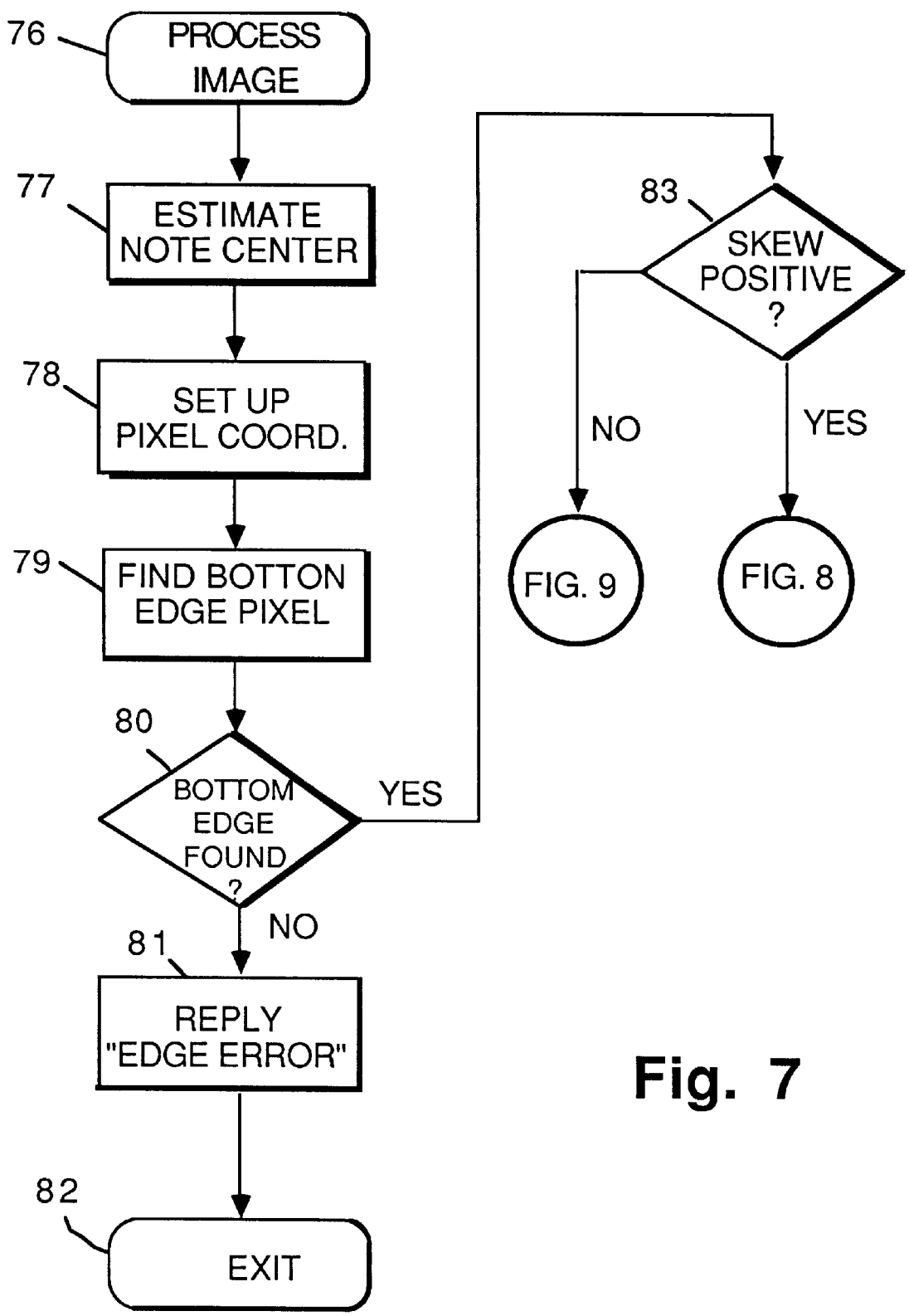
Figure 9:
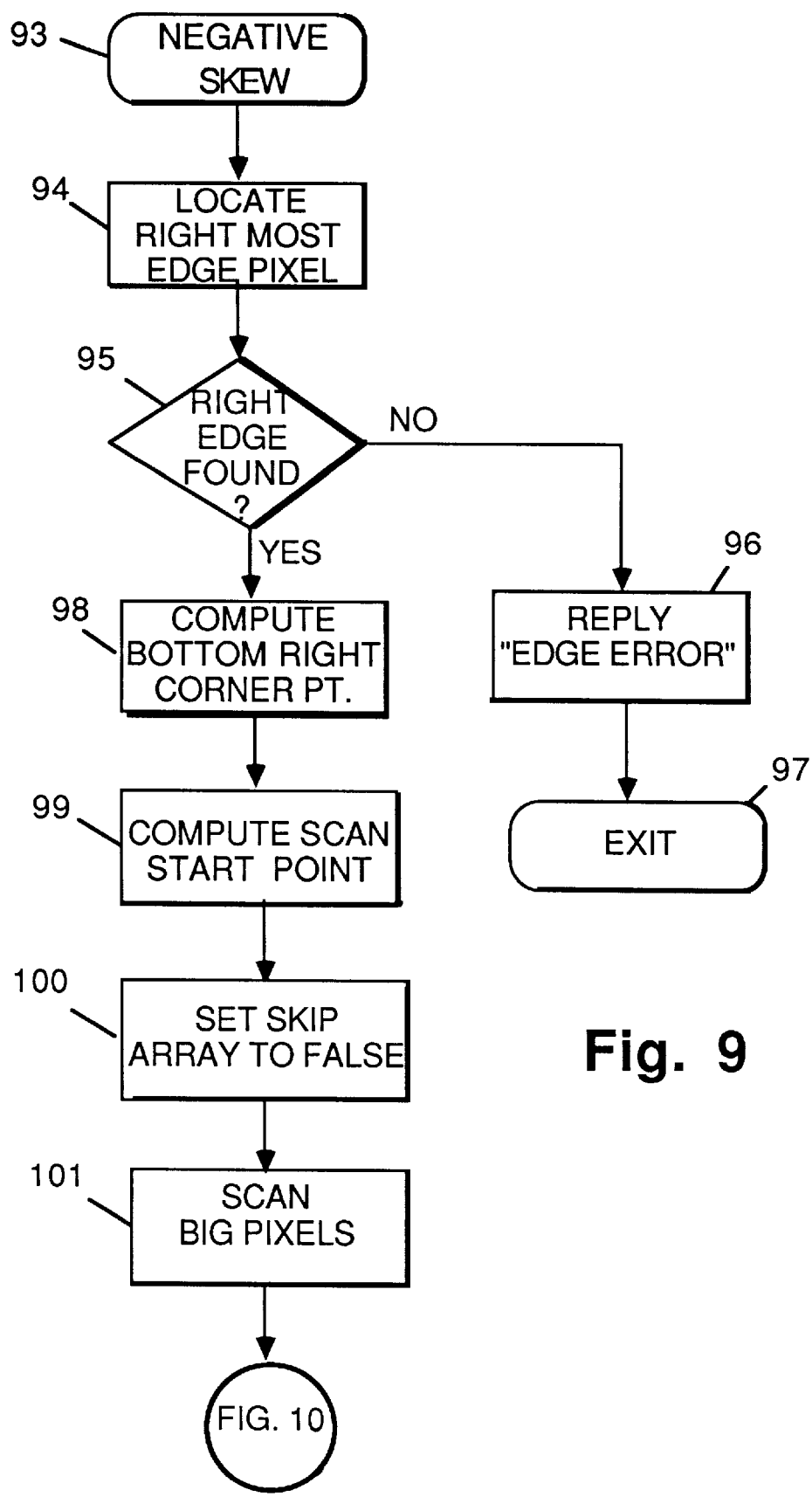
Figure 10:
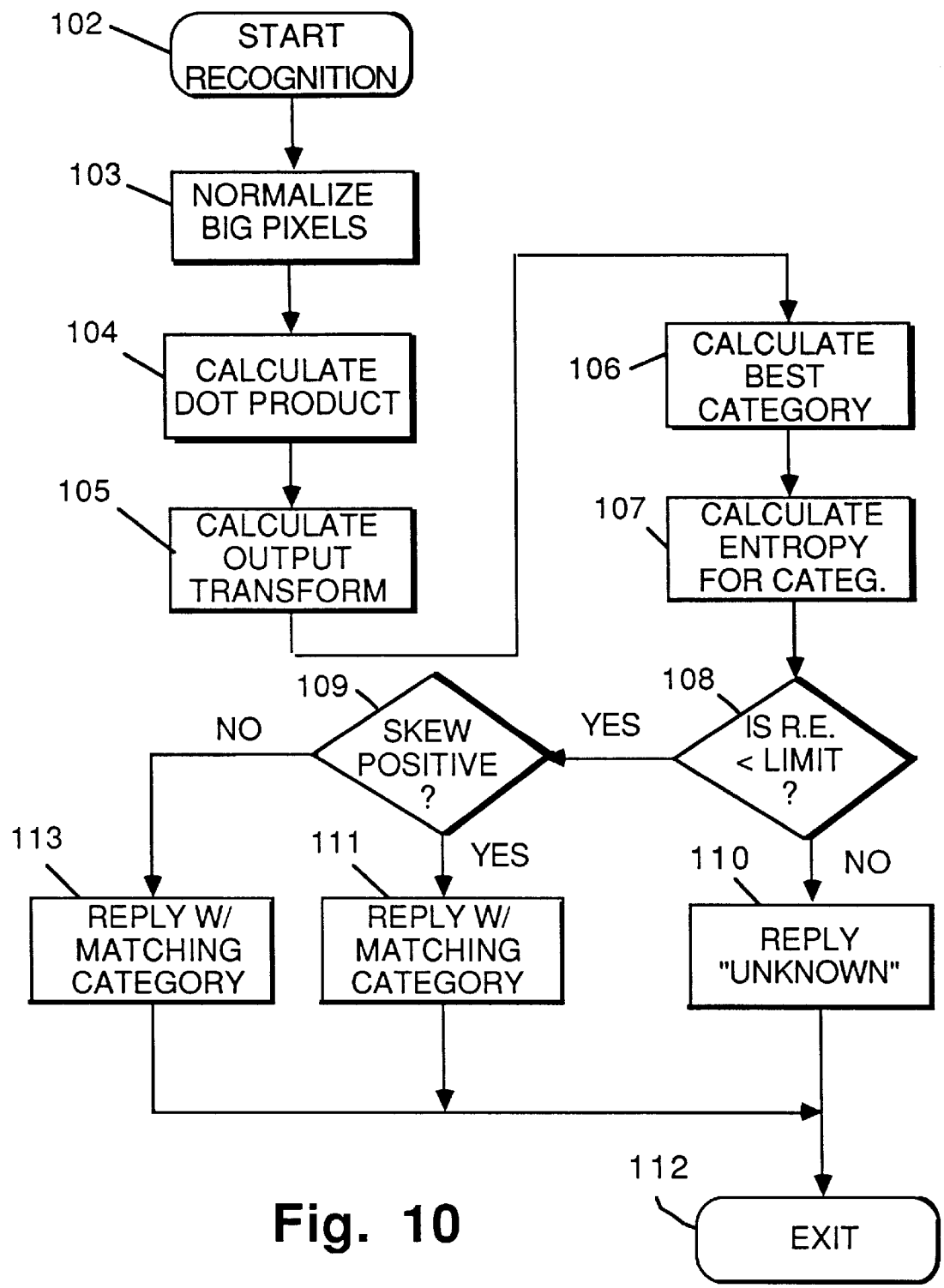

Referring to FIG. 7, an image processing routine generally represented by blocks 42, 43 and 44 in FIG. 3 is shown in more detail in FIG. 7. This routine is initiated by a command from the command processor portion of the program 19, and this is represented by start block 76. Two crucial pieces of data are provided by the currency counter 10: the position (encoder value) of the note's leading edge, and the note's skew angle. The image processing routine uses this data in four steps: first, determine the note's exact position (edge finding) (blocks 77–80); second, determine the skew of the note (block 83 and FIGS. 8–9); third, scan pixels into an image map, which is more particularly a feature vector (FIGS. 8–9), and identify the image map by currency denomination (FIG. 10).

The command processor passes the recognition request along with the encoder value at which the leading edge of the note 13 crosses the line between the count sensors 33, 34, along the machine centerline 202, as seen in FIG. 1a. Since the recognition apparatus 10 is provided with the distance (d) between the count sensors 33, 34 (FIG. 1a) and the imaging arrays 15, 16 (FIG. 1a), it knows when the leading edge of the note 13 can be expected to cross the imaging arrays 15, 16. An estimate of the encoder value of the note's center at the imaging arrays 15, 16 is constructed as:

The note center (encoder, at imaging arrays)=note centerline lead (encoder at count sensor, from counter)+distance between count sensors and imaging sensor (encoder)+ average note length/2 (encoder).

The execution of a block of the program 19 to locate the note center is represented by process block 77 in FIG. 7. Then, as represented by process block 78, a local pixel coordinate system is established at that estimated note center (encoder). This system has the following desirable parameters:

1) It is a 'first quadrant' system. All coordinates are non-negative. Film pixels have (small) integer coordinates, and the coordinates of adjacent pixels differ by 1. Pixels can be efficiently accessed via array indexing.

3) The leftmost pixel of each raster has an x-axis coordinate of "0", a rightmost coordinate along the x-axis of "143".

4) The coordinate system is optimally centered in the sense that when the raster row with y-axis coordinate "0" is about to be overwritten (in the film loop), the estimated note center (from above) is centered in the loop, with approximately equal amounts of film above and below it. (i.e., Since the loop has one hundred twenty-eight raster rows, the given note center estimate (encoder) is mapped to pixel y-axis coordinate "64".)

The other parameter from the counter is the note's skew. This is expressed as the number of encoder lengths (7.621 encoder lengths=1 mm.) between the leading edge crossings of the two count sensors. It is a signed quantity. Since the recognition apparatus is provided with the distance between the two count sensors, it knows the skew angle. Skew angles are such that: −90 degrees<skew<90 degrees. However, the skew angle is not converted to angular form. Instead, it is converted to a direction vector, with a unit length, for example, a vector of (1, 0) represents zero skew. The x-axis coordinate of the skew vector is always positive, and the y-axis coordinate carries the sign. The usual algebraic convention is followed: Positive skew (i.e., positive y-axis component) is a counterclockwise rotation. This skew direction vector will be denoted as (SX, SY) in FIG. 2. Because positive and negative skews have to be handled differently, the remainder of this section will assume non-negative skew. Negative skews will be addressed at the end.

Figure 2:
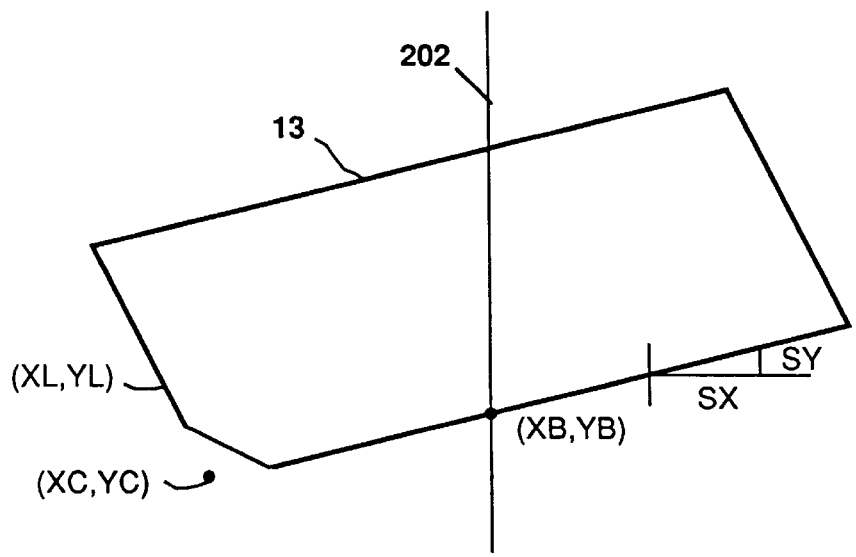
FIG. 2 is a schematic diagram of a note and the coordinate system for reporting note position.

Next, as represented by process block 79, the CPU 14 executes a portion of the program 19 to find the leading (bottom) edge, along the machine centerline 202. Let Y be the estimated y-axis coordinate of the note's leading edge at the imaging sensor along the machine centerline 202 as seen in FIG. 2. The line from (72, Y−12) to (72, Y+12) is searched for an edge pixel. An edge pixel is defined as a pixel which is a portion of the note (not air), and whose neighbor (backwards, along the direction of search) is air. This point is identified as (XB, YB) in FIG. 2, where XB is 72.

Next, as illustrated in FIG. 2, a better bottom edge point is searched for. This is done by searching vertical lines with x-axis coordinates from "70" to "84" (twelve pixels either side of centerline 202). Each of those vertical lines, from (X, YB–12) to (X, YB+12) is scanned for an edge pixel. The "bottom most" edge pixel is declared to be the bottom edge point (XB, YB). "Bottom most" almost means "least y-axis coordinate," but not quite. The comparison must take skew into account.

As represented by process block 80 (FIG. 7), a check is made to see if the search for a bottom edge point was successful. If not, as represented by the "NO" result, an "edge error" message is returned to the currency counter, as represented by process block 81, and the routine is exited as represented by process block 82. If the bottom edge point was located, as represented by the "YES" result, a check is made to determine if the skew is positive. If the result of this test is "YES," then the CPU 14 proceeds to execute a positive skew routine shown in FIG. 8. If the result of this test is "NO," then the CPU 14 proceeds to execute a negative skew routine shown in FIG. 9.

Figure 8:
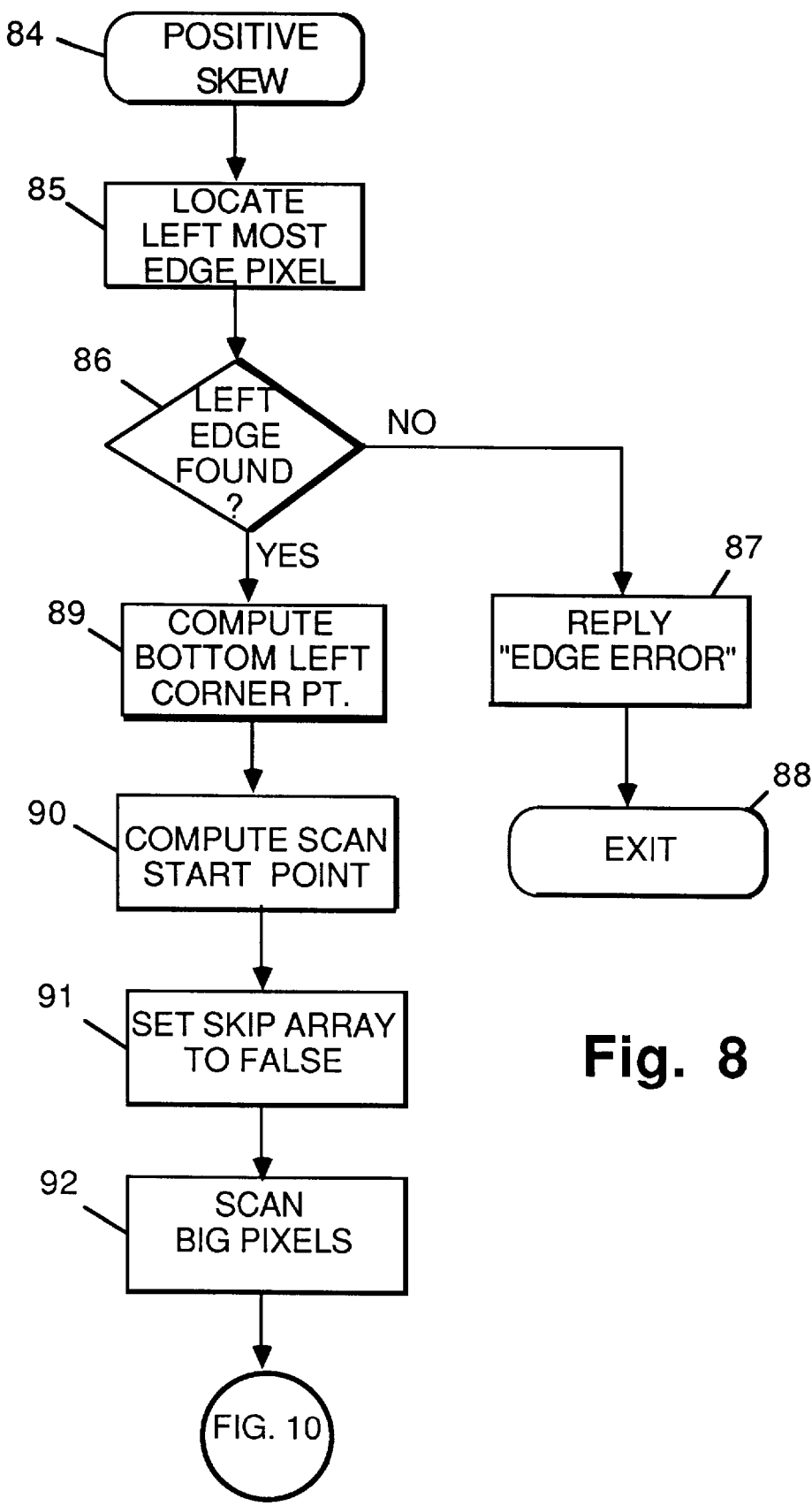

Referring to FIG. 8, the beginning of the positive skew routine is represented by start block 84. As represented by process block 85, instructions are then executed by the CPU 14 to find a point on the left edge of the note. A range of horizontal lines, with y-axis coordinates from YB–12 to YB+12 is scanned for a left edge point. The procedure is very similar to the bottom edge procedure, except "left most" replaces "bottom most". We call this left edge point (XL, YL) (FIG. 2). A check is then made to see if the left most edge was found, as represented by decision block 86. If the answer is "NO," and edge error message is generated, as represented by process block 86, and then the routine is exited as represented by exit block 88. If the answer is "YES," then a bottom left corner point (XC, YC) (FIG. 2) is calculated, as represented by process block 89, according to the following expressions:

$$XC = SY*SY*XB + SX*SX*XL + SX*SY*(YL-YB)$$

$$YC = SY*SY*YL + SX*SX*YB + SX*SY*(XL-XB)$$

The next step, represented by process block 90, is to compute the scan image starting point.

The scanned image is to use big pixels which are each formed of a 3×3 array of small pixels. The starting point for the scanned image is to be one big pixel in from the lower left corner (FIG. 2).

To do this, instructions are executed to compute a starting point (X0, Y0), represented by process block 90, as follows:

$$(X0, Y0) = (3,3) \text{ rotated by the skew angle (SX, SY)}$$

and $$(X, Y) = (XC, YC) + (X0, Y0)$$

Now (X, Y) is the (coordinate of the) small pixel which is the lower left portion of the first big pixel. From here it is straightforward to scan the entire note as big pixels. The averaging effect of the big pixels is sometimes characterized as blurring, although other types of blurring have been known. The elements of the scanned image or feature vector are the big pixels comprising most of the note. These elements are then normalized, to stabilize the contrast, thus reducing sensitivity to soil and wear.

It was determined that a rectangle of 30 wide×11 high of big pixels covers most of a U.S. note. This rectangle is offset one big pixel to the upper right from the lower left corner of the note (FIG. 2) and is approximately centered within the note 13.

The CPU 14 executes instructions represented by process block 91 (FIG. 8) to account for missing portions of the notes (e.g., holes, tears). This is accomplished by setting an array of flags 30×11, parallel to the big pixel array, to "false."

Then the big pixel array is scanned, as represented by process block 92 (FIG. 8). While a big pixel is being averaged (summed), if any of its constituent small pixels are air, the flag element corresponding to that big pixel is set to "true." This will cause it to be ignored in a later step. This means that a big pixel is used only if all of its component small pixels are valid note information.

During scanning, each step (e.g., (1, 0) is a small x step; (0, 3) is a big y step) is rotated by the skew angle, to maintain alignment with the note.

The output of this scanning is an array, 30×11, of big (averaged) pixel values.

It should be noted that during this scanning process, all coordinates are very likely not to be exact integers. Whenever a small pixel value is needed during this process, it is obtained by interpolating the integer coordinate data in two dimensions. This is sometimes known as bilinear interpolation. After scanning of the big pixel array, processing proceeds to a recognition portion of the program 19 in FIG. 10, as represented by the connector labeled "FIG. 10."

Referring to FIG. 10, after the beginning of the recognition routine represented by start block 102, the CPU executes program instructions represented by the first process block 103 for normalization the "big" pixels. As mentioned above, this is done to provide a more stable feature vector to the recognizer, by (at least partially) eliminating the effects of soil and wear. After normalizing, the big pixels have the following properties: Their mean is 0.0. Their standard deviation is 1.0. Any big pixels which contained air (i.e., had its flag set) is replaced by 0.0. The above mean and standard deviation "includes" these "0"-value pixels. The normalization equation is the (unique) linear mapping which satisfies the above properties.

The above process results in the "feature vector" comprising the above 330 (30×11) pixels. The two-dimensional aspect of the data is ignored. The feature vector is simply a linear vector, with 330 elements.

The feature vector is recognized by means of a classification neural network through steps represented by blocks 104–108. This is a single layer network, with an unusual output transformation that is calculated by executing instructions represented by process block 105.

First, the feature vector is augmented by appending a small constant term, 1.0, to its end. This is the same, mathematically, as allowing a non-zero intercept in a linear regression model. In neural network terms, it is called a "bias" input. So the feature vector now contains 331 elements.

There are thirty-two pattern vectors. For eight currency denominations $1, $2, $5, $10, $20, $50, the old $100 and the new $100, there are four orientations: front face up, back face up, head first and feet first. Each pattern vector is the same size as the feature vector, 331 elements.

In the following formulas, the following expressions are defined as follows:

D[c]=dot product of the feature vector with pattern vector c.

E[c]=exp(D[c]); i.e., e raised to the D[c]'th power.

S=sum of all 32 E[c]'s.

O[c]=E[c]/S.

RE[c]=−Ln(O[c]); i.e., negative natural log of O[c].

That is the (run-time) neural network. The O[c]'s are the network outputs. They are all positive, and their sum is 1. The note is recognized as that category, c, which has the largest value for O[c], and the processing to find this category is represented by process block 106 in FIG. 10. The value RE[c] is known as the Relative Entropy. It serves as an accuracy estimate, i.e., it measures how well the feature vector has been classified. It ranges from 0.0, a perfect match (and mathematically impossible), to 3.47 (−Ln(1/32)), a miserable match.

After determining the category, c, a process block 107 is executed to compute RE[c], which is then compared against a built-in threshold, as represented by decision block 108. If the "R.E." is less than the threshold, the note is defined as "category c," and the "YES" result is followed to the next decision block 110. If the "R.E" is greater than the threshold, an "Unknown" message is set up for transfer to the currency counter, as represented by process block 110, and the routine is exited as represented by exit block 112. A typical threshold is 0.12.

The above discussion assumed positive skew. Certain changes are necessary for negative skews. The reason is that it is important to determine the note's position as early as possible. That way, the feature vector scanning can occur as the note is passing over the sensor, allowing the earliest possible response to the counter.

The pattern is referenced to the lower left corner of the note. But with negative skew, the lower right corner is the first to pass over the sensor. Mirror symmetry is used to adjust for that.

Therefore, in the above procedures for finding the edges and scanning the feature vector, swap "left" and "right" wherever they occur. As illustrated in FIG. 9, for example, instead of finding the left edge, the CPU 14 executes a block of instructions 94 to find the right most edge pixel, which is checked through execution of decision block 95. And, process block 98 is executed to compute a bottom right corner point in place of a left corner point. The other blocks, 96, 97, 99, 100 and 101 correspond to corresponding blocks described in relation to FIG. 8 for positive skew. Also, the scanning process adjusts the step vectors such that the note is scanned right-to-left instead of left-to-right.

The net result of this is that a note with negative skew is scanned as if it were flipped over (i.e., rotated about the y axis; black vs. green; not head vs. feet).

This causes the feature vector to match the wrong pattern, but in a predictable way. So, when the recognition routine matches a note which had negative skew, it substitutes the mirror category for the matched one in its reply.

Returning to FIG. 10, if during execution of decision block 109, the skew is negative, the recognition routine branches as decision block 109 to process block 113 to find the matching category for negative skew, before exiting to routine at terminal block 112.

This has been a detailed description of various examples of how the invention can be carried out. To apprise the public of the scope of invention, the following claims are made. Those of ordinary skill in the art will recognize that the various details may be modified in arriving at other detailed embodiments, and that these embodiments will come within the scope of the invention, either literally or under the doctrine of equivalents.

We claim:

1. A method of detecting the denomination of a currency note transported along a path of travel, the method comprising:

receiving position and skew data detected by external sensors for sensing the position and skew of the note;

assembling a first data image of pixel data representing a two-dimensional image of substantially all of the note while averaging the pixel data in groups for further processing;

adjusting the first data image to account for anomalies in the pixel data in said first data image;

correcting the first data image based on the skew data to eliminate skew; and relating the first data image to a plurality of pre-defined data images according to a mathematical function to determine whether the first data image can be classified as matching any one of the pre-defined plurality of data images corresponding to a specific currency denominations;

wherein the adjusting step includes testing each pixel to detect absence of note material, and when an absence of note material is detected, the pixel data is set to a neutral value to identify the absence of note material in order to facilitate comparison of the first data image to each of the plurality of pre-defined data images to determine the specific currency denomination.

2. The method of claim 1, wherein the first data image and the plurality of pre-defined data images comprise big pixels, each of which is at least a 3×3 array of small pixels.

3. The method of claim 1, wherein the relating step utilizes a neural network function to compare the first data image to each of the plurality of pre-defined data images to determine a denomination of the note.

4. The method of claim 3, wherein a relative entropy is calculated for the denomination resulting from application of the neural network function, and wherein a comparison is made between the relative entropy and a minimum threshold to determine if a tentative match determined by the neural network function is an acceptable match.

5. The method of claim 1, wherein the correction step includes testing for positive skew or negative skew, and wherein upon detecting positive skew, the data for the first image is assembled by scanning the note from left to right, and wherein upon detecting negative skew of the note, the data image for the first data image is assembled by right to left scanning of the note.

6. The method of claim 1, further comprising the step of adjusting light emitters and light detectors prior to assembling a first data image, wherein electrical power to the light emitters is adjusted and power to amplifiers for transmitting signals from the light detectors are adjusted, in response to light transmissivity scaling factors, such that the light emitters and light detectors are calibrated to operate in a predetermined range of operation.

7. An apparatus for detecting the denomination of a currency note transported along a path of travel, the apparatus comprising:

an imaging section for generating signals which can be converted to image data for assembling a first image of the note when transported along the path of travel;

an interface for receiving position data and skew data detected by external sensors for sensing the position and skew of the note;

a processor connected for receiving the position data and the skew data from the interface and for executing a first group of program instructions for reading and assembling a first data image of pixel data representing a two-dimensional image of substantially all of the note while averaging the pixel data in groups for further processing;

wherein the processor executes a second group of program instructions for correcting the first data image based on the skew data to eliminate skew;

wherein the processor executes a third group of program instructions for adjusting the first data image to account for anomalies in said first data image, the third group of program instructions being executed to test each pixel to detect absence of note material, and when an absence of note material is detected, the pixel data is set to a neutral value to identify the absence of note material in order to facilitate comparison of the first data image to each of a plurality of pre-defined data images to determine a specific currency denomination; and wherein the processor executes a fourth group of program instructions for relating the first data image to the plurality of pre-defined data images according to a mathematical function to determine whether the first data image can be classified as matching any one of the plurality of pre-defined data images corresponding to a specific currency denomination.

8. The apparatus of claim 7, wherein the first data image and the plurality of pre-defined data images comprise big pixels, each of which is a 3×3 array of small pixels.

9. The apparatus of claim 7, wherein the fourth group of program instructions utilizes a neural network function to compare the first data image to each of the plurality of pre-defined data images to determine a denomination of the note.

10. The apparatus of claim 9, wherein the fourth group of program instructions is executed to calculate a relative entropy for the denomination resulting from application of the neural network function, and wherein a comparison is made by the processor between the relative entropy and a minimum threshold to determine if a tentative match determined by the neural network function is an acceptable match.

11. The apparatus of claim 7, wherein the processor executes a fifth group of program instructions to test for positive skew or negative skew, and wherein upon detecting positive skew, the processor executes further instructions for assembling the data for the first image by scanning the note from left to right, and wherein upon detecting negative skew of the note, the processor executes further instructions for assembling the data for the first image by scanning of the note from right to left.

12. The apparatus of claim 7, wherein the imaging section includes light emitters and light detectors, and wherein the processor executes a sixth group of program instructions to adjust power to the light emitters and to adjust power of the signals from the light detectors prior to assembling a first data image, in response to light transmissivity scaling factors, such that the light emitters and light detectors are calibrated to operate in a predetermined range of operation.

* * * * *